United States Patent
Smyth et al.

(10) Patent No.: US 9,509,492 B2
(45) Date of Patent: Nov. 29, 2016

(54) AUTHENTICATION DEVICE, OUTPUT DEVICE, VERIFICATION DEVICE AND INPUT DEVICE

(71) Applicant: Kabushiki Kaisha Toshiba, Minato-ku (JP)

(72) Inventors: Ben Smyth, Hitchin (GB); Yoshikazu Hanatani, Kawasaki (JP); Hirofumi Muratani, Kawasaki (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 236 days.

(21) Appl. No.: 14/200,406

(22) Filed: Mar. 7, 2014

(65) Prior Publication Data

US 2014/0334622 A1    Nov. 13, 2014

(30) Foreign Application Priority Data

May 8, 2013 (JP) ................................. 2013-098817

(51) Int. Cl.
*H04L 29/06* (2006.01)
*H04L 9/00* (2006.01)
*H04L 9/32* (2006.01)
*H04L 9/30* (2006.01)

(52) U.S. Cl.
CPC ............. *H04L 9/008* (2013.01); *H04L 9/3218* (2013.01); *H04L 9/3271* (2013.01); *H04L 9/3013* (2013.01)

(58) Field of Classification Search
CPC ... H04L 9/008; H04L 9/3013; H04L 9/3271; H04L 9/3218
USPC ............................................ 380/28; 713/168
See application file for complete search history.

(56) References Cited

U.S. PATENT DOCUMENTS

2001/0024501 A1* 9/2001 Furukawa ............. H04L 9/3271 380/28
2004/0030932 A1* 2/2004 Juels ..................... H04L 63/083 713/151

(Continued)

OTHER PUBLICATIONS

Jai Xu and Ee-Chien Chang, Towards Efficient Proofs of Retrievability, May 4, 1012, ASIACSS '12 Proceedings of the 7th ACM Symposium on Information, Computer and Communications Security, pp. 79-80.*
Alexandre Pinto, Andr'e Souto, Armando Matos, and Lu'is Antunes, Commitment and Authentication Systems, 2009, Springer-Verlag, pp. 1-22, downloaded from http://link.springer.com/chapter/10.1007%2F978-3-642-10230-1_1 on Jul. 6, 2016.*

(Continued)

*Primary Examiner* — Carl Colin
*Assistant Examiner* — Gary Lavelle
(74) *Attorney, Agent, or Firm* — Oblon, McClelland, Maier & Neustadt, L.L.P.

(57) ABSTRACT

According to an authentication device is for authenticating the validity of a subject ciphertext generated by encrypting a plaintext using homomorphic encryption. The authentication device includes a commitment generator and a response generator. The commitment generator is configured to generate a commitment from a randomly selected verification value, and transmit the commitment to a verification device for verifying the validity of the subject ciphertext. The response generator is configured to generate a response value generated by computing from an acquired challenge value, the plaintext, and the verification value, and transmit the response value to the verification device. The response generator is configured to generate the response value by a third operation where a result of a first operation using the response value is equal to a result of processing the challenge value, the subject ciphertext, and the commitment by a second operation.

20 Claims, 10 Drawing Sheets

(56) References Cited

U.S. PATENT DOCUMENTS

| | | | |
|---|---|---|---|
| 2009/0080645 A1* | 3/2009 | Furukawa | G06Q 20/382 380/28 |
| 2014/0189361 A1* | 7/2014 | Sakumoto | H04L 9/3271 713/176 |

OTHER PUBLICATIONS

David Bernhard et al. "Adapting Helios for provable ballot privacy", ESORICS 2011, LNCS 6879, 2011, 20 pages.

Moni Naor et al "Public-key Cryptosystems Provably Secure against Chosen Ciphertext Attacks", ACM Press, 1990, 11 pages.

* cited by examiner

AUTHENTICATION DEVICE, OUTPUT DEVICE, VERIFICATION DEVICE AND INPUT DEVICE

CROSS-REFERENCE TO RELATED APPLICATION

This application is based upon and claims the benefit of priority from Japanese Patent Application No. 2013-098817, filed on May 8, 2013; the entire contents of which are incorporated herein by reference.

FIELD

Embodiments described herein relate generally to an authentication device, an output device, a verification device and an input device.

BACKGROUND

A non-interactive zero-knowledge authentication is known as a protocol for verifying knowledge of the answer to a question. Combination of the non-interactive zero-knowledge and public key cryptography allows decryption of a ciphertext after verifying the validity of the ciphertext. This can increase the security of the public key cryptography.

The non-interactive zero-knowledge authentication combined with the public key cryptography, however, is disadvantageous not only in that more computational cost is required for encryption and decryption but also in that ciphertexts become longer.

DETAILED DESCRIPTION

According to an authentication device is for authenticating the validity of a subject ciphertext generated by encrypting a plaintext using homomorphic encryption. The authentication device includes a commitment generator and a response generator. The commitment generator is configured to generate a commitment from information at least including a randomly selected verification value, and transmit the commitment to a verification device for verifying the validity of the subject ciphertext. The response generator is configured to generate a response value generated by computing from information at least including an acquired challenge value, the plaintext, and the verification value, and transmit the response value to the verification device. The response generator is configured to generate the response value by a third operation where a result of a first operation using the response value is equal to a result of processing the challenge value, the subject ciphertext, and the commitment by a second operation.

First Embodiment

Figure 1:
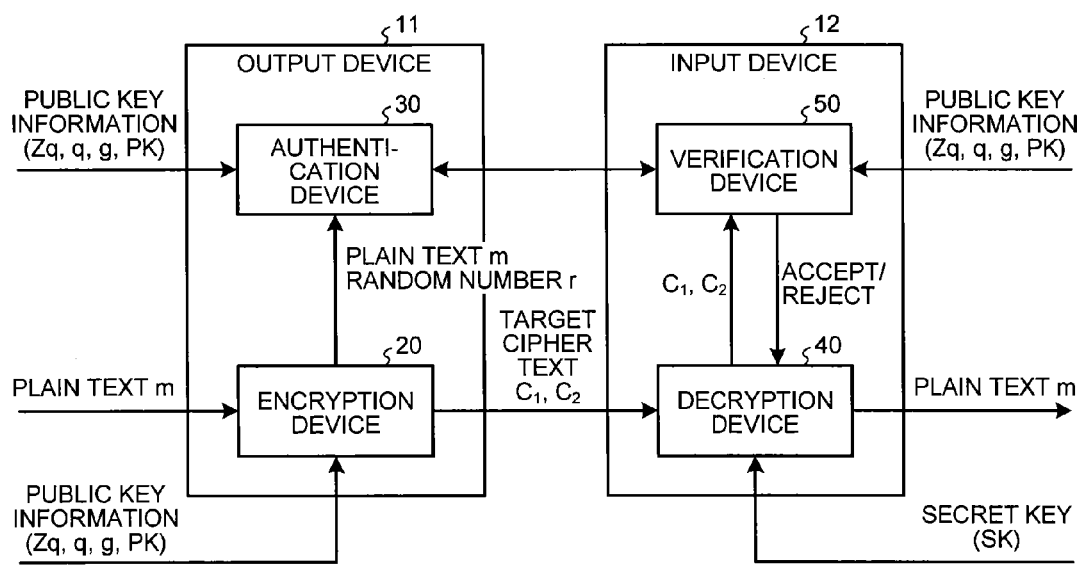
FIG. 1 is a configuration diagram of a cryptographic system according to a first embodiment.

FIG. 1 is a diagram illustrating the configuration of a cryptographic system according to the first embodiment. The cryptographic system 10 according to the first embodiment includes an output device 11 and an input device 12. The output device 11 and the input device 12 are connected via a network or the like and communicate information with each other.

The output device 11 includes an encryption device 20 and an authentication device 30. The input device 12 includes a decryption device 40 and a verification device 50.

The encryption device 20 generates a ciphertext generated by encrypting a plaintext using homomorphic encryption. The encryption device 20 then transmits the generated ciphertext to the decryption device 40. The decryption device 40 receives a ciphertext from the encryption device 20 of the output device 11. The decryption device 40 then decrypts the received ciphertext and outputs a plaintext.

In the present embodiment, the encryption device 20 and the decryption device 40 perform processing using the modified ElGamal encryption. When the modified ElGamal encryption is used, the encryption device 20 and the decryption device 40 perform the following processing.

The decryption device 40 holds a secret key SK in a hidden state. The encryption device 20 acquires public key information. The public key information contains a cyclic group $G_q$, an order q of the cyclic group $G_q$, a generator g of the cyclic group $G_q$, and a public key PK.

The secret key SK and the public key PK have the relations expressed by the following Equation (111) and Equation (112). Note that x is a value randomly selected from a cyclic group $Z_q$ (for example, integers from 0 to q−1).

$$SK = x \tag{111}$$

$$PK = g^x \text{ over } G_q \tag{112}$$

At the rest of this embodiment, algebraic operations are defined over $G_q$ without no special notes.

The encryption device 20 receives a plaintext m. The plaintext m is a value selected from the cyclic group $Z_q$. The encryption device 20 also randomly selects a random number r from the cyclic group $Z_q$.

The encryption device 20 computes the following Equation (113) and Equation (114) on the basis of the public key PK, the plaintext m, and the random number r to generate ciphertexts $C_1$, $C_2$.

$$C_1 = g^r \tag{113}$$

$$C_2 = g^m \cdot PK^r \tag{114}$$

The encryption device 20 transmits the thus generated ciphertexts $C_1$, $C_2$ to the decryption device 40. The decryption device 40 receives the ciphertexts $C_1$, $C_2$ from the encryption device 20.

The decryption device 40 computes the following Equation (115) on the basis of the ciphertexts $C_1$, $C_2$ and the secret key SK to obtain $g^m$.

$$g^m = C_2 / (C_1^{SK}) \quad (115)$$

Subsequently, the decryption device 40 sequentially raises the generator g by a certain value m' to find a value $g^{m'}$ equal to $g^m$. The decryption device 40 then can obtain the value m' when the value $g^{m'}$ equal to $g^m$ is obtained as a decryption result (plaintext m).

While the example using the modified ElGamal encryption is described in the present embodiment, the encryption device 20 and the decryption device 40 may alternatively perform processing using other homomorphic encryptions such as Rabin encryption.

In the meantime, the authentication device 30 and the verification device 50 authenticate and verify whether a ciphertext transferred from the encryption device 20 to the decryption device 40 is valid, that is, whether the ciphertext is generated by using a correct plaintext and random number. A ciphertext to be verified transferred from the encryption device 20 to the decryption device 40 will be referred to a subject ciphertext.

In this example, the authentication device 30 receives the plaintext m and the random number r used to generate the subject ciphertexts $C_1$, $C_2$ from the encryption device 20. The authentication device 30 then communicates with the verification device 50 in the Sigma Protocol by using the public key information ($Z_q$, q, g, PK), and authenticates to the verification device 50 that the subject ciphertexts $C_1$, $C_2$ are valid.

The verification device 50 receives the subject ciphertexts $C_1$, $C_2$ from the decryption device 40. The verification device 50 then communicates with the authentication device 30 in the Sigma Protocol by using the public key information ($Z_q$, q, g, PK), and verifies that the subject ciphertexts $C_1$, $C_2$ are valid.

If the received subject ciphertexts $C_1$, $C_2$ are determined to be valid, the verification device 50 gives acceptance (Accept) to the decryption device 40. If the received subject ciphertexts $C_1$, $C_2$ are determined not to be valid, the verification device 50 gives rejection (Reject) to the decryption device 40. The decryption device 40 then decrypts the subject ciphertexts $C_1$, $C_2$ and outputs the plaintext m on the condition that the ciphertexts $C_1$, $C_2$ are determined to be valid by the verification device 50.

Figure 2:
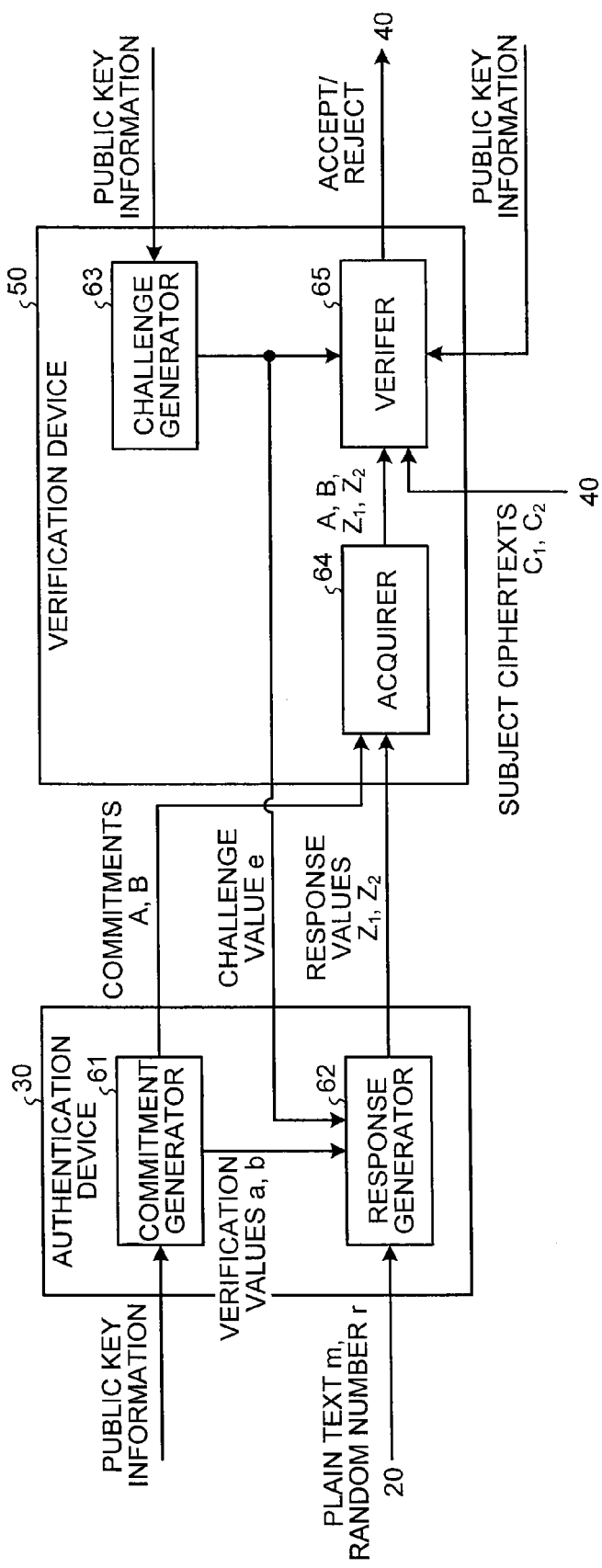
FIG. 2 is a configuration diagram of an authentication device and a verification device according to the first embodiment.

FIG. 2 is a diagram illustrating the configuration of the authentication device 30 and the verification device 50 according to the first embodiment. The authentication device 30 includes a commitment generator 61 and a response generator 62. The verification device 50 includes a challenge generator 63, an acquirer 64, and a verifier 65.

The commitment generator 61 of the authentication device 30 randomly selects a verification value. Subsequently, the commitment generator 61 generates a commitment from the randomly-selected verification value. The commitment generator 61 then transmits the generated commitment to the acquirer 64 of the verification device 50. The commitment generator 61 also passes the verification value to the response generator 62.

In the example using the modified ElGamal encryption, the commitment generator 61 randomly selects two verification values a, b from the cyclic group $Z_q$. The commitment generator 61 then generates two commitments A, B through the same processing as encryption in the modified ElGamal encryption in which a is a random number and b is a plaintext. Specific expressions will be described in detail with reference to FIG. 3.

The challenge generator 63 of the verification device 50 randomly selects a challenge value. The challenge generator 63 then transmits the randomly-selected challenge value to the response generator 62 of the authentication device 30. In the example using the modified ElGamal encryption, the challenge generator 63 randomly selects one challenge value e from the cyclic group $Z_q$.

The response generator 62 of the authentication device 30 receives the challenge value, the plaintext, the random number, and the verification value. The response generator 62 generates a response value generated by computing from the challenge value, the plaintext, the random number, and the verification value. The response generator 62 then transmits the generated response value to the acquirer 64 of the verification device 50. In this case, the response generator 62 generates the response value by operation where a ciphertext generated by encrypting the operation result using homomorphic encryption is equal to a ciphertext generated by computing from the challenge value, the subject ciphertext, and the commitment by predetermined homomorphic operation.

Note that homomorphic operation is operation capable of adding plaintexts without decrypting ciphertexts when multiple ciphertexts are computed. Specifically, the homomorphic operation is operation where the relations as in the following Equation (116) and Equation (117) are satisfied.

$$\mathrm{Enc}(x) \times \mathrm{Enc}(y) = \mathrm{Enc}(x+y) \quad (116)$$

$$(\mathrm{Enc}(x))^z = \mathrm{Enc}(z \cdot x) \quad (117)$$

In Equation (116) and Equation (117), Enc(x) represents a ciphertext generated by encrypting a plaintext x. Enc(y) represents a ciphertext generated by encrypting a plaintext y. Enc(x+y) represents a ciphertext generated by encrypting the result of adding the plaintext x and the plaintext y. Enc(z·x) represents a ciphertext generated by encrypting the result of multiplying the plaintext x by the plaintext y.

In Equation (116) and Equation (117), "x" represents multiplication of ciphertexts and is an example of homomorphic operation. In addition, $(\mathrm{Enc}(x))^z$ represents the z-th power of the ciphertext (that is, z multiplications of one ciphertext) and is an example of homomorphic operation.

Note that concrete operation of homomorphic operation varies according to the encryption method. For example, in the modified ElGamal encryption, plaintexts are added as a result of multiplying ciphertexts and a plaintext is multiplied by a constant as a result of multiplying a ciphertext the constant number of times.

In the example using the modified ElGamal encryption, the response generator 62 generates two response values $Z_1$, $Z_2$ by computing from the challenge e, the plaintext m, the random number r, and the two verification values a, b. Specific expressions will be described in detail with reference to FIG. 3.

The acquirer 64 of the verification device 50 acquires the commitment and the response value from the authentication device 30. The acquirer 64 then passes the acquired commitment and response value to the verifier 65. In the example using the modified ElGamal encryption, the acquirer 64 receives two commitments A, B and two response values $Z_1$, $Z_2$.

The verifier 65 of the verification device 50 receives the commitment and the response value from the acquirer 64. The verifier 65 also receives the subject ciphertext from the decryption device 40. The verifier 65 determines that the subject ciphertext is valid if a value derived from the response value through a predetermined procedure and a ciphertext generated by computing from the challenge value, the subject ciphertext, and the commitment by predetermined homomorphic operation are equal. In this case, the verifier 65 computes a value from the challenge value, the subject ciphertext, and the commitment by homomorphic operation where the operation result is equal to a ciphertext generated by encrypting the response value by the homomorphic encryption.

In the example using the modified ElGamal encryption, the verifier 65 encrypts the two response values $Z_1$, $Z_2$ through the same processing as the modified ElGamal encryption in which $Z_1$ is a random number and $Z_2$ is a plaintext to generate a left-hand side ciphertext. Specific expressions will be described in detail with reference to FIG. 3.

Furthermore, in the example using the modified ElGamal encryption, the verifier 65 generates a right-hand side ciphertext which is computed from the challenge value e, the subject ciphertexts $C_1$, $C_2$, and the commitments A, B by predetermined homomorphic operation. In this case, the verifier 65 generates the right-hand side ciphertext by homomorphic operation where the operation result is equal to the left-hand side ciphertext. Specific expressions will be described in detail with reference to FIG. 3.

In the example using the modified ElGamal encryption, the verifier 65 then determines whether or not the left-hand side ciphertext and the right-hand side ciphertext are equal to each other. If the ciphertexts are equal, the verifier 65 determines that the subject ciphertexts $C_1$, $C_2$ are correct and supplies acceptance (Accept) to the decryption device 40. If the ciphertexts are not equal, the verifier 65 determines that the subject ciphertexts $C_1$, $C_2$ are not correct and supplies rejection (Reject) to the decryption device 40.

Figure 3:
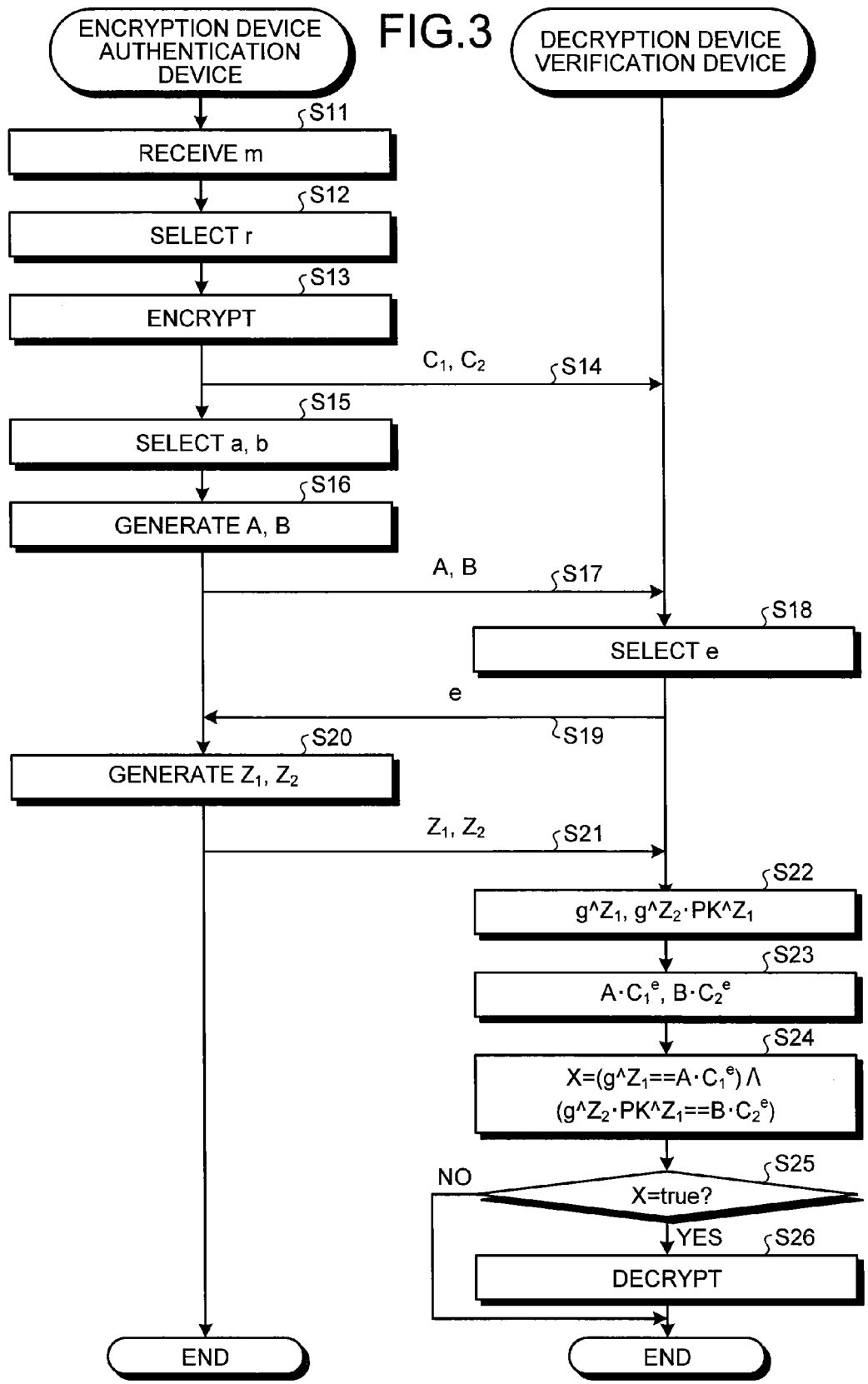
FIG. 3 is a process flowchart of the cryptographic system according to the first embodiment.

FIG. 3 is a chart illustrating a process flow of the cryptographic system 10 according to the first embodiment. With reference to FIG. 3, the process flow of the cryptographic system 10 according to the first embodiment using the modified ElGamal encryption will be described.

First, in step S11, the encryption device 20 receives a plaintext m. Subsequently, in step S12, the encryption device 20 randomly selects a random number r from the cyclic group $Z_q$.

Subsequently, in step S13, the encryption device 20 encrypts the plaintext m with the random number r by the modified ElGamal encryption to generate subject ciphertexts $C_1$, $C_2$. Specifically, the encryption device 20 generates the subject ciphertexts $C_1$, $C_2$ by computing the following Equation (121) and Equation (122).

$$C_1 = g^r \tag{121}$$

$$C_2 = g^m \cdot PK^r \tag{122}$$

Subsequently, in step S14, the encryption device 20 transmits the subject ciphertexts $C_1$, $C_2$ to the decryption device 40.

Subsequently, in step S15, the commitment generator 61 of the authentication device 30 randomly selects two verification values a, b from the cyclic group $Z_q$.

Subsequently, in step S16, the commitment generator 61 encrypts the verification value b by using the verification value a by the modified ElGamal encryption to generate two commitments A, B. Specifically, the commitment generator 61 generates two commitments A, B by computing the following Equation (123) and Equation (124) on the basis of the two verification values a, b, the generator g, and the public key PK.

$$A = g^a \tag{123}$$

$$B = g^b \cdot PK^a \tag{124}$$

Note that, if the verification value a is replaced with the random number r and the verification value b is replaced with the plaintext m, Equation (123) becomes the same as Equation (121) and Equation (124) becomes the same as Equation (122). Thus, when the verification value a corresponds to the random number r and the verification value b corresponds to the plaintext m, the commitment generator 61 generates the commitment A by the same operation as that for the subject ciphertext $C_1$ and generates the commitment B by the same operation as that for the subject ciphertext $C_2$.

Subsequently, in step S17, the commitment generator 61 transmits the commitments A, B to the acquirer 64 of the verification device 50.

Subsequently, in step S18, the challenge generator 63 of the verification device 50 randomly selects a challenge value e from the cyclic group $Z_q$. Subsequently, in step S19, the challenge generator 63 transmits the challenge value e to the response generator 62 of the authentication device 30.

Subsequently, in step S20, the response generator 62 of the authentication device 30 generates two response values $Z_1$, $Z_2$ by computing the following Equation (125) and Equation (126) on the basis of the two verification values a, b, the random number r, the plaintext m, the challenge value e, and the order q of the cyclic group $Z_q$. Note that "+" represents the addition operator, "·" represents the multiplication operator, and "mod" represents the modulus operator.

$$Z_1 = (a + e \cdot r) \bmod q \tag{125}$$

$$Z_2 = (b + e \cdot m) \bmod q \tag{126}$$

Subsequently, in step S21, the response generator 62 transmits the two response values $Z_1$, $Z_2$ to the acquirer 64 of the verification device 50.

Subsequently, in step S22, the verifier 65 of the verification device 50 encrypts the response value $Z_2$ with the response value $Z_1$ as the random number by the modified ElGamal encryption to generate a first left-hand side ciphertext and a second left-hand side ciphertext.

Specifically, the verifier 65 generates the first left-hand side ciphertext and the second left-hand side ciphertext by computing the following Equation (127) and Equation (128) on the basis of the two response values $Z_1$, $Z_2$, the generator g, and the public key PK. Note that "^" represents the power operator. Thus, "x^y" represents $x^y$.

$$\text{First left-hand side ciphertext} = g\hat{\ }Z_1 \tag{127}$$

$$\text{Second left-hand side ciphertext} = g\hat{\ }Z_2 \cdot PK\hat{\ }Z_1 \tag{128}$$

Note that, if the response value $Z_1$ is replaced with the random number r and the response value $Z_2$ is replaced with the plaintext m, Equation (127) becomes the same as Equation (121) and Equation (128) becomes the same as Equation (122). Thus, when the response value $Z_1$ corresponds to the random number r and the response value $Z_2$ corresponds to the plaintext m, the verifier 65 generates the first left-hand side ciphertext (Equation (127)) by the same operation as that for the subject ciphertext $C_1$ and generates the second left-hand side ciphertext (Equation (128)) by the same operation as that for the subject ciphertext $C_2$.

Subsequently, in step S23, the verifier 65 computes the following Equation (129) to generate a first right-hand side ciphertext using the challenge value e, the subject ciphertext $C_1$, and the commitment A by the homomorphic operation. At the same time, the verifier 65 computes the following Equation (130) to generate a second right-hand side ciphertext using the challenge value e, the subject ciphertext $C_2$, and the commitment B by the homomorphic operation.

$$\text{First right-hand side ciphertext} = A \cdot C_1^e \quad (129)$$

$$\text{Second right-hand side ciphertext} = B \cdot C_2^e \quad (130)$$

Here, the first left-hand side ciphertext of Equation (127) is expanded as expressed by the following Equation (131).

$$\text{First left-hand side ciphertext} = g^{\hat{}}Z_1 = g^{(a+e \cdot r)} \quad (131)$$

The first right-hand side ciphertext of Equation (129) is expanded as expressed by the following Equation (132).

$$\text{First right-hand side ciphertext} = A \cdot C_1^e = g^a \cdot (g^r)^e = g^{(a+e \cdot r)} \quad (132)$$

Thus, the first left-hand side ciphertext of Equation (127) and the first right-hand side ciphertext of Equation (129) are equal.

Furthermore, the second left-hand side ciphertext of Equation (128) is expanded as expressed by the following Equation (133).

$$\text{Second left-hand side ciphertext} = g^{\hat{}}Z_2 \cdot PK^{\hat{}}Z_1 = g^{(b+e \cdot m)} \cdot PK^{(a+e \cdot r)} \quad (133)$$

The second right-hand side ciphertext of Equation (130) is expanded as expressed by the following Equation (134).

$$\text{Second right-hand side ciphertext} = B \cdot C_2^e = g^b \cdot PK^a \cdot (g^m \cdot PK^r)^e = g^{(b+e \cdot m)} PK^{(a+e \cdot r)} \quad (134)$$

Thus, the second left-hand side ciphertext of Equation (128) and the second right-hand side ciphertext of Equation (130) are equal.

Thus, the response generator 62 generates the response values $Z_1$, $Z_2$ by operation where ciphertexts (the first left-hand side ciphertext and the second left-hand side ciphertext) generated by encrypting the operation result by the modified ElGamal encryption are equal to ciphertexts (the first right-hand side ciphertext and the second right-hand side ciphertext) generated by computing from the challenge value e, the subject ciphertexts $C_1$, $C_2$, and the commitments A, B by the predetermined procedure. In other words, the verifier 65 generates a combined ciphertext (the first right-hand side ciphertext and the second right-hand side ciphertext) generated by computing from the challenge value e, the subject ciphertexts $C_1$, $C_2$, and the commitments A, B by the homomorphic operation where the operation result is equal to the ciphertexts (the first left-hand side ciphertext and the second left-hand side ciphertext) generated by encrypting the response value $Z_2$ with the response value $Z_1$ as the random number by the modified ElGamal encryption.

Subsequently, in step S24, the verifier 65 computes the following Equation (135).

$$X = (g^{\hat{}}Z_1 == A \cdot C_1^e) \wedge (g^{\hat{}}Z_2 \cdot PK^{\hat{}}Z_1 == B \cdot C_2^e) \quad (135)$$

Note that "==" represents outputting true if the left-hand side and the right-hand side are equal and false if the left-hand side and the right-hand side are not equal. Furthermore, "∧" represents outputting a logical product of the left-hand side and the right-hand side. Thus, true is output for "true ∧ true" and otherwise false is output.

Subsequently, in step S25, the verifier 65 determines whether or not X is true. Specifically, the verifier 65 determines whether the first left-hand side ciphertext and the first right-hand side ciphertext are equal to each other and the second left-hand side ciphertext and the second right-hand side ciphertext are equal to each other.

If the first left-hand side ciphertext and the first right-hand side ciphertext are equal to each other and the second left-hand side ciphertext and the second right-hand side ciphertext are equal to each other (Yes in step S25), the verifier 65 proceeds the processing to step S26. In step S26, the decryption device 40 decrypts the subject ciphertexts $C_1$, $C_2$ received from the encryption device 20 and outputs the plaintext m. The decryption device 40 then terminates this flow.

If the first left-hand side ciphertext and the first right-hand side ciphertext are not equal to each other and/or the second left-hand side ciphertext and the second right-hand side ciphertext are not equal to each other (No in step S25), the verifier 65 terminates this flow without performing decryption.

As described above, the cryptographic system 10 according to the first embodiment generates a commitment and a response value so that a ciphertext generated by computing from a challenge value, a subject ciphertext and the commitment by homomorphic operation and a ciphertext generated by encrypting the response value using homomorphic encryption are equal to each other. As a result, according to the cryptographic system 10, it is possible to easily verify whether a subject ciphertext is valid without decrypting the subject ciphertext.

Second Embodiment

Figure 4:
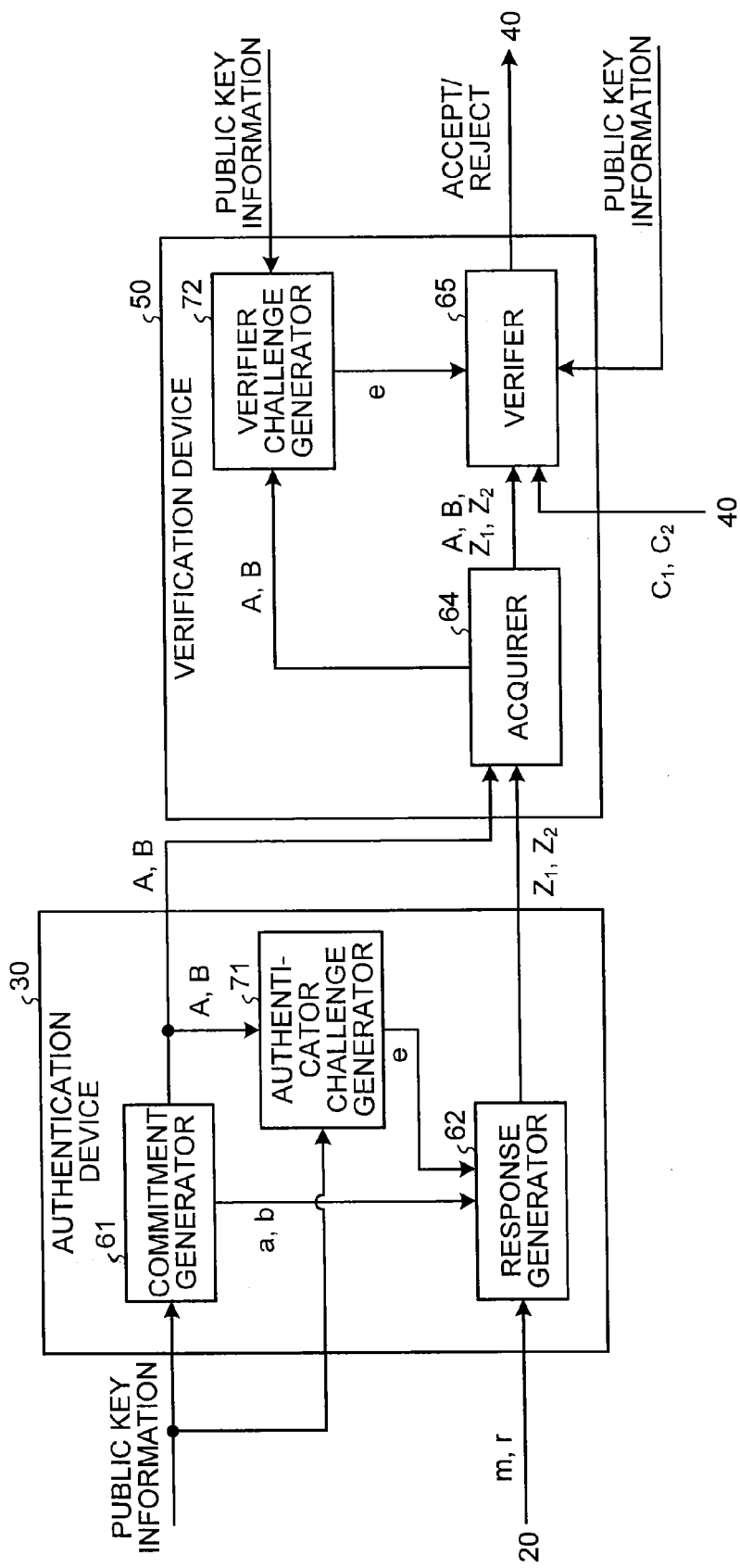
FIG. 4 is a configuration diagram of an authentication device and a verification device according to a second embodiment.

FIG. 4 is a diagram illustrating the configuration of an authentication device 30 and a verification device 50 according to the second embodiment. A cryptographic system 10 according to the second embodiment has substantially the same functions and configuration as those of the cryptographic system 10 according to the first embodiment. Thus, in the description of the cryptographic system 10 according to the second embodiment, the units having substantially the same functions and configuration as those in the first embodiment will be designated by the same reference numerals and description thereof will not be repeated except for the difference.

The authentication device 30 according to the second embodiment further includes an authenticator challenge generator 71. The verification device 50 according to the second embodiment includes a verification device challenge generator 72 instead of the challenge generator 63.

The authenticator challenge generator 71 acquires the commitments A, B generated by the commitment generator 61. The authenticator challenge generator 71 inputs the acquired commitments A, B and the public key information to a predetermined hash function to generate a challenge value e. The authenticator challenge generator 71 supplies the generated challenge value e to the response generator 62.

The verification device challenge generator 72 acquires the commitments A, B and the public key information received by the acquirer 64. The verification device challenge generator 72 inputs the acquired commitments A, B and the public key information to the predetermined hash function to generate a challenge value e. Note that the verification device challenge generator 72 generates the challenge value e by the same hash function as that used by the authenticator challenge generator 71. The verification device challenge generator 72 supplies the generated challenge value e to the verifier 65.

With the cryptographic system 10 according to the second embodiment, the authenticator challenge generator 71 and the verification device challenge generator 72 are provided, which can omit transmission of the challenge value e from the verification device 50 to the authentication device 30. As a result, the cryptographic system 10 can verify whether or not the subject ciphertexts $C_1$, $C_2$ are valid through one-way transmission of information from the authentication device 30 to the verification device 50.

While a hash function is used to generate the challenge value e in the present embodiment, the function that can be used for the generation is not limited to the hash function but may be any function with an unpredictable output and a range of the cyclic group $Z_q$. While a hash function is used to generate the challenge value e in the present embodiment, the function can takes additional elements which are predetermined in the cryptographic system 10, e.g., the subject ciphertexts $C_1$, $C_2$ or a sequential number.

Third Embodiment

Figure 5:
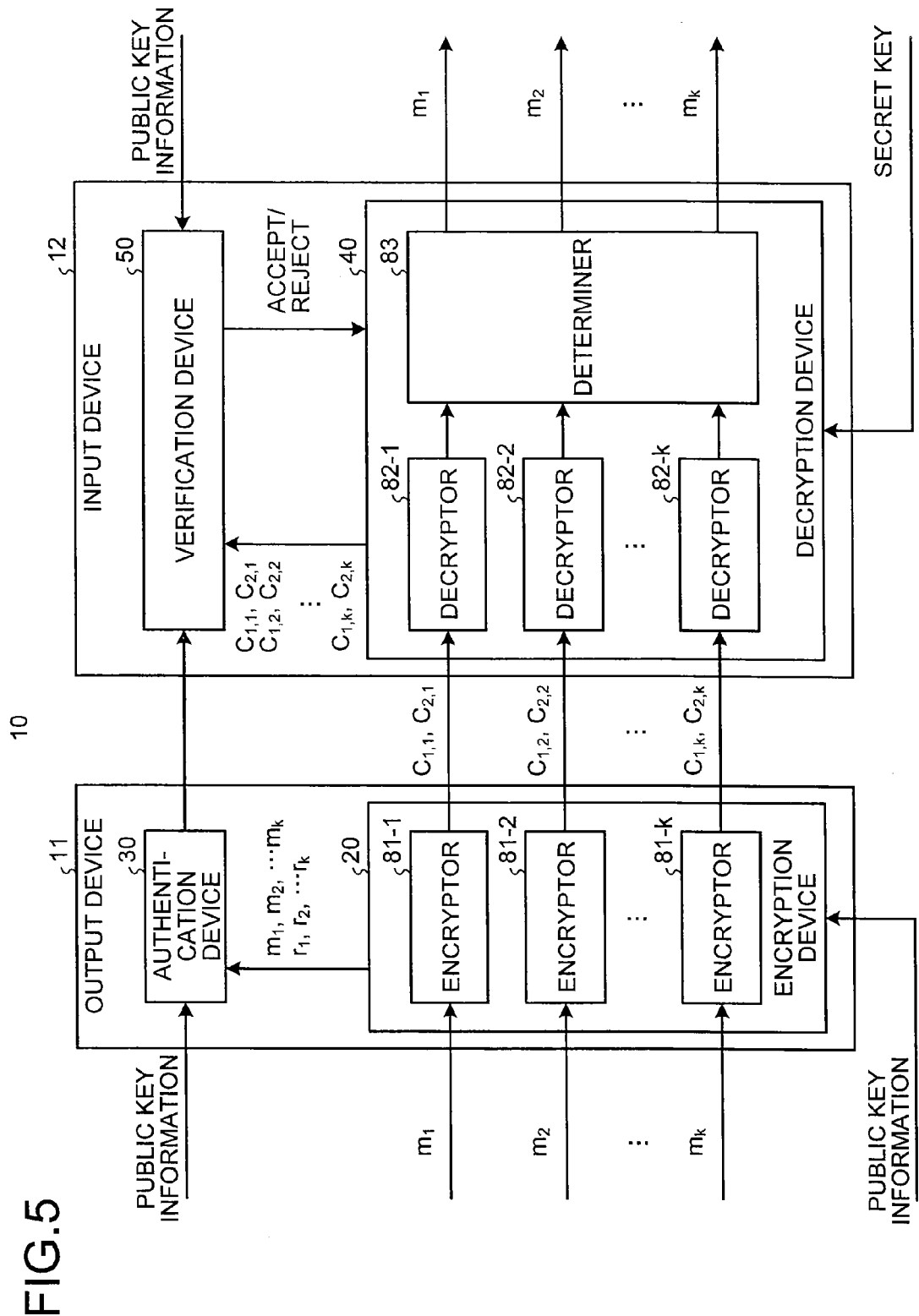
FIG. 5 is a configuration diagram of a cryptographic system according to a third embodiment.

FIG. 5 is a diagram illustrating the configuration of a cryptographic system 10 according to the third embodiment. A cryptographic system 10 according to the third embodiment has substantially the same functions and configuration as those of the cryptographic system 10 according to the second embodiment. Thus, in the description of the cryptographic system 10 according to the third embodiment, the units having substantially the same functions and configuration as those in the second embodiment will be designated by the same reference numerals and description thereof will not be repeated except for the difference.

An encryption device 20 according to the third embodiment encrypts each of multiple plaintexts to generate multiple ciphertexts. A decryption device 40 according to the third embodiment decrypts each of multiple ciphertexts and outputs multiple plaintexts.

In this example, the encryption device 20 includes k (k is an integer of 2 or greater) encryptors 81-1 to 81-k. The k encryptors 81-1 to 81-k generate k random numbers $r_1$ to $r_k$ and encrypts k plaintexts $m_1$ to $m_k$ by the modified ElGamal encryption to generate k sets of subject ciphertexts $(C_{1,1}, C_{2,1})$ to $(C_{1,k}, C_{2,k})$.

The decryption device 40 includes k decryptors 82-1 to 82-k and a determiner 83. The k decryptors 82-1 to 82-k decrypt k sets of subject ciphertexts $(C_{1,1}, C_{2,1})$ to $(C_{1,k}, C_{2,k})$, and output k plaintexts $m_1$ to $m_k$. The determiner 83 outputs k plaintexts $m_1$ to $m_k$ resulting from the decryption by the k decryptors 82-1 to 82-k on the condition that all of the k sets of subject ciphertexts $(C_{1,1}, C_{2,1})$ to $(C_{1,k}, C_{2,k})$ are determined to be valid by the verification device 50.

The encryption device 20 can be constructed that it includes only one encryptor and it uses the encryptor k times. The decryption device 40 can be constructed that it includes only one decryptor and it uses the decryptor k times.

The authentication device 30 receives k plaintexts $m_1$ to $m_k$ and random numbers $r_1$ to $r_k$ from the encryption device 20. The authentication device 30 then communicates with the verification device 50 in the Sigma Protocol by using the public key information $(Z_q, q, g, PK)$, and authenticates to the verification device 50 that each of the k sets of subject ciphertexts $(C_{1,1}, C_{2,1})$ to $(C_{1,k}, C_{2,k})$ is valid.

The verification device 50 receives the k sets of subject ciphertexts $(C_{1,1}, C_{2,1})$ to $(C_{1,k}, C_{2,k})$ from the decryption device 40. The verification device 50 then communicates with the authentication device 30 in the Sigma Protocol by using the public key information $(Z_q, q, g, PK)$, and verifies that each of the k sets of subject ciphertexts $(C_{1,1}, C_{2,1})$ to $(C_{1,k}, C_{2,k})$ is valid.

If all of the received k sets of subject ciphertexts $(C_{1,1}, C_{2,1})$ to $(C_{1,k}, C_{2,k})$ are determined to be valid, the verification device 50 gives acceptance (Accept) to the decryption device 40. If all of the received k sets of subject ciphertexts $(C_{1,1}, C_{2,1})$ to $(C_{1,k}, C_{2,k})$ are not determined to be valid, the verification device 50 gives rejection (Reject) to the decryption device 40.

Figure 6:
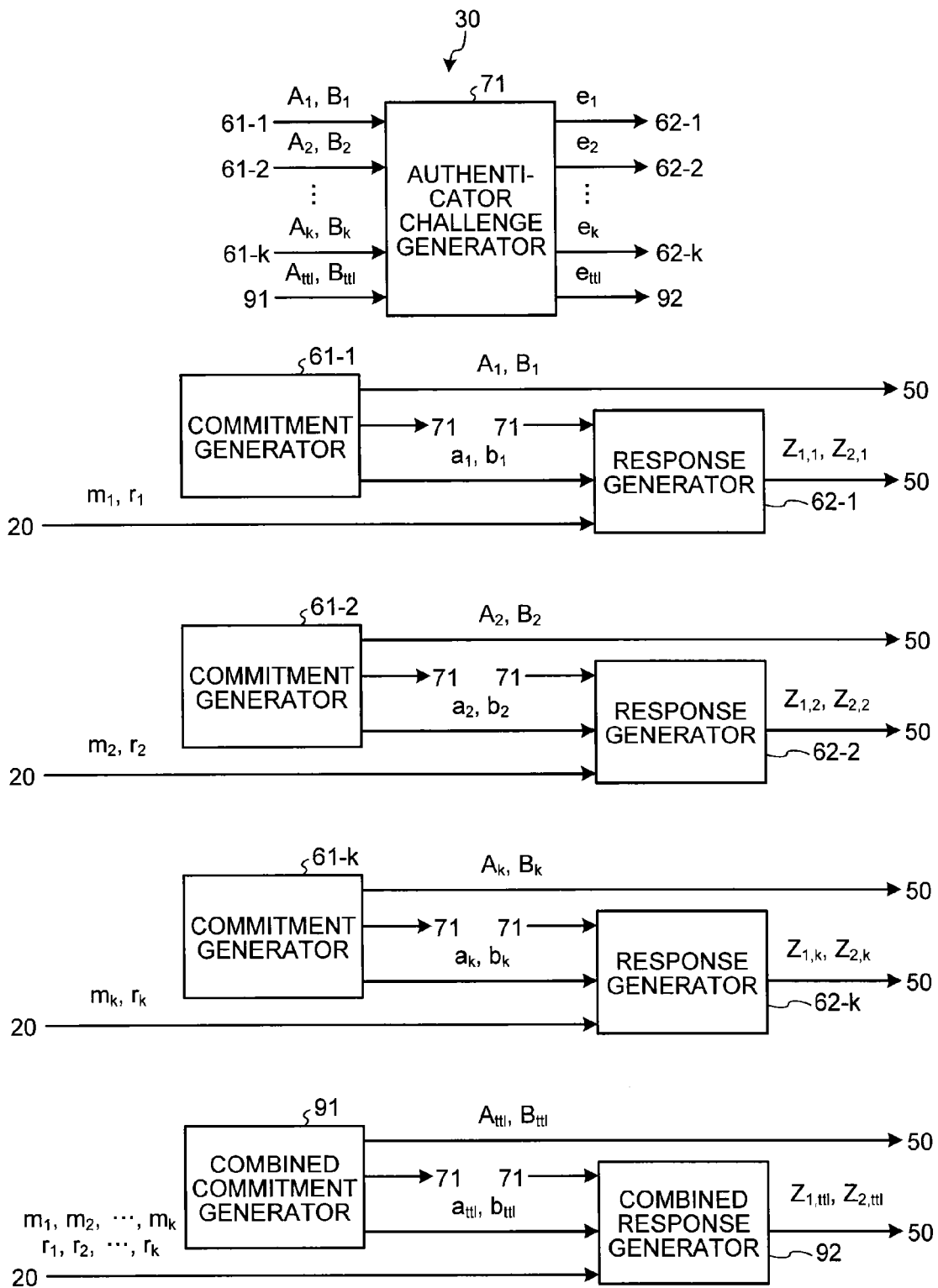
FIG. 6 is a configuration diagram of an authentication device according to the third embodiment.

FIG. 6 is a diagram illustrating the configuration of the authentication device 30 according to the third embodiment. The authentication device 30 according to the third embodiment includes k commitment generators 61-1 to 61-k, a combined commitment generator 91, an authenticator challenge generator 71, k response generators 62-1 to 62-k, and a combined response generator 92.

The k commitment generators 61-1 to 61-k are respectively associated with the k sets of subject ciphertexts $(C_{1,1}, C_{2,1})$ to $(C_{1,k}, C_{2,k})$ and each perform the same processing as the commitment generator 61 of the first embodiment on the associated subject ciphertexts.

More specifically, the commitment generator 61-1 generates two verification values $a_1$, $b_1$ and two commitments $A_1$, $B_1$. The commitment generator 61-2 generates two verification values $a_2$, $b_2$ and two commitments $A_2$, $B_2$. The commitment generator 61-k generates two verification values $a_k$, $b_k$ and two commitments $A_k$, $B_k$. The authentication device 30 can be constructed that it includes only one commitment generator and it uses the commitment generator k times.

The combined commitment generator 91 is associated with combined subject ciphertexts $(C_{1,ttl}, C_{2,ttl})$ generated by combining the k sets of subject ciphertexts $(C_{1,1}, C_{2,1})$ to $(C_{1,k}, C_{2,k})$ by homomorphic operation, and performs the same processing as the commitment generator 61 of the first embodiment on the combined subject ciphertexts $(C_{1,ttl}, C_{2,ttl})$. More specifically, the combined commitment generator 91 generates two combined verification values $a_{ttl}$, $b_{ttl}$, and two combined commitments $A_{ttl}$, $B_{ttl}$.

The authenticator challenge generator 71 inputs k sets of commitments $(A_1, B_1)$ to $(A_k, B_k)$ output from the k commitment generators 61-1 to 61-k and one set of combined commitments $(A_{ttl}, B_{ttl})$ output from the combined commitment generator 91. The authenticator challenge generator 71 then inputs (2k+2) commitments to a hash function and outputs k challenge values $e_1$, $e_2$, ..., $e_k$ and one combined challenge value $e_{ttl}$. The authenticator challenge generator 71 can be constructed that it inputs each set of commitment $(A_i, B_i)$ to a hash function to sequentially compute the challenge value $e_i$. While a hash function is used to generate the challenge values $e_1$, $e_2$, ..., $e_k$ in the present embodiment, the function can takes additional elements which are predetermined in the cryptographic system 10, e.g., the subject ciphertexts $(C_{1,1}, C_{2,1})$ to $(C_{1,k}, C_{2,k})$, the combined subject ciphertexts $(C_{1,ttl}, C_{2,ttl})$, or sequential numbers.

The k response generators 62-1 to 62-k are respectively associated with the k sets of subject ciphertexts $(C_{1,1}, C_{2,1})$ to $(C_{1,k}, C_{2,k})$ and each perform the same processing as the response generator 62 of the first embodiment on the associated subject ciphertexts.

More specifically, the response generator 62-1 generates two response values $Z_{1,1}$, $Z_{2,1}$ from the challenge value $e_1$, the plaintext $m_1$, the random number $r_1$, and two verification values $a_1$, $b_1$. The response generator 62-2 generates two response values $Z_{1,2}$, $Z_{2,2}$ from the challenge value $e_2$, the plaintext $m_2$, the random number $r_2$, and two verification values $a_2$, $b_2$. The response generator 62-$k$ generates two response values $Z_{1,k}$, $Z_{2,k}$ from the challenge value $e_k$, the plaintext $m_k$, the random number $r_k$, and two verification values $a_k$, $b_k$. The authentication device 30 can be constructed that it includes only one response generator and it uses the response generator k times.

The combined response generator 92 is associated with the combined subject ciphertext $(C_{1,ttl}, C_{2,ttl})$ generated by combining k sets of subject ciphertexts $(C_{1,1}, C_{2,1})$ to $(C_{1,k}, C_{2,k})$ by homomorphic operation. The combined response generator 92 generates a combined plaintext $m_{ttl}$ generated by combining k plaintexts $m_1, m_2, \ldots, m_k$ by a plaintext operation corresponding to the homomorphic operation. In the modified ElGamal encryption, the combined response generator 92 adds all of the k plaintexts $m_1, m_2, \ldots, m_k$ over $Z_q$ to generate the combined plaintext $m_{ttl}$.

The combined response generator 92 generates a combined random number $r_{ttl}$ generated by combining k random numbers $r_1, r_2, \ldots, r_k$ by operation corresponding to the homomorphic operation. For example, in the modified ElGamal encryption, the combined response generator 92 adds all of the k random numbers $r_1, r_2, \ldots, r_k$ over $Z_q$ to obtain the combined random number $r_{ttl}$.

The combined response generator 92 then performs the same processing as the response generator 62 of the first embodiment on the basis of the combined challenge value $e_{ttl}$, the combined plaintext $m_{ttl}$, the combined random number $r_{ttl}$, and the two combined verification values $a_{ttl}$, $b_{ttl}$. More specifically, the combined response generator 92 generates two combined response values $Z_{1,ttl}$, $Z_{2,ttl}$ from the combined challenge value $e_{ttl}$, the combined plaintext $m_{ttl}$, the combined random number $r_{ttl}$, and the two combined verification values $a_{ttl}$, $b_{ttl}$.

Figure 7:
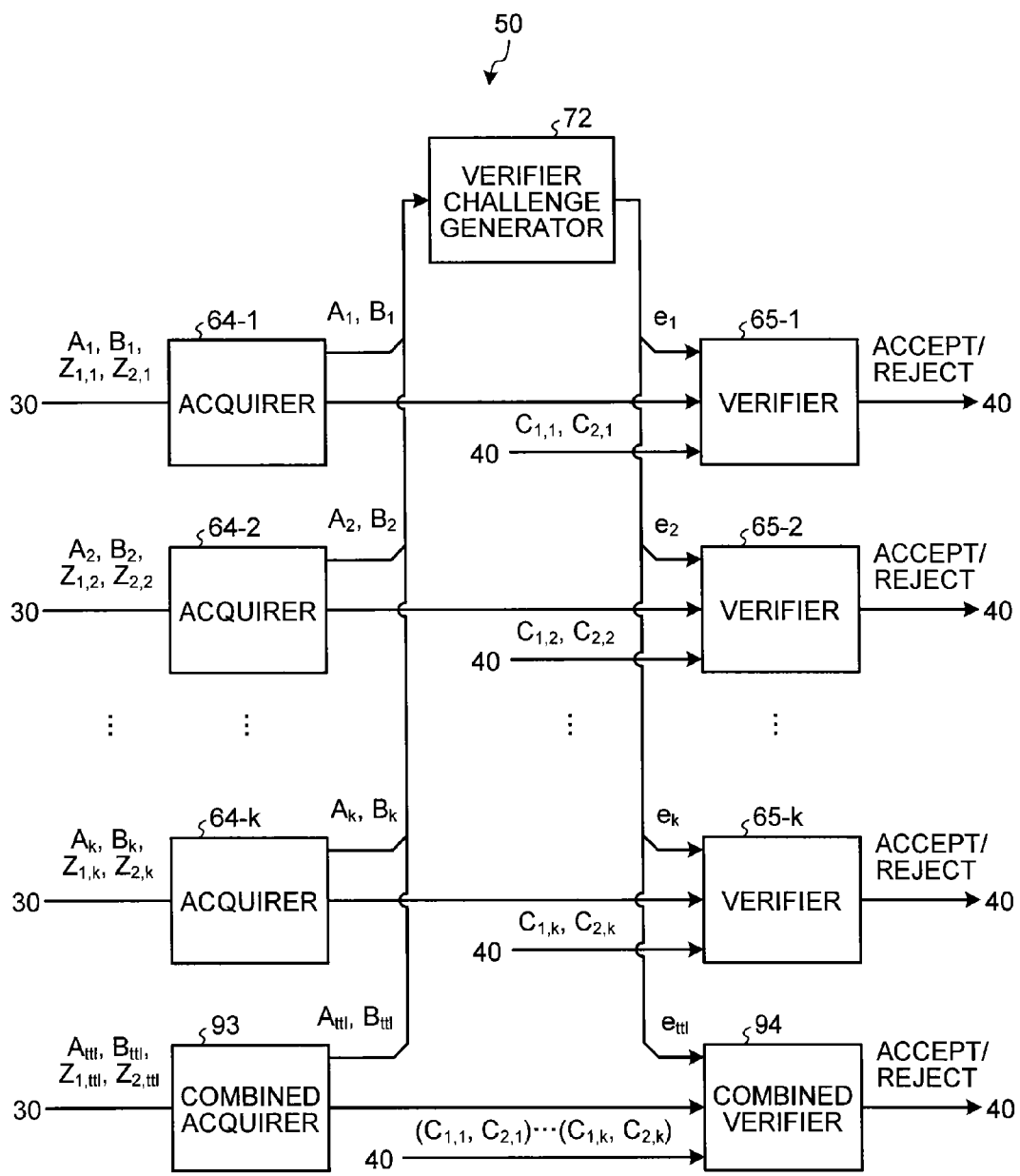
FIG. 7 is a configuration diagram of a verification device according to the third embodiment.

FIG. 7 is a diagram illustrating the configuration of the verification device 50 according to the third embodiment. The verification device 50 includes k acquirers 64-1 to 64-$k$, a combined acquirer 93, a verification device challenge generator 72, k verifiers 65-1 to 65-$k$, and a combined verifier 94.

The k acquirers 64-1 to 64-$k$ are respectively associated with the k sets of subject ciphertexts $(C_{1,1}, C_{2,1})$ to $(C_{1,k}, C_{2,k})$ and each perform the same processing as the acquirer 64 of the first embodiment on the associated subject ciphertexts.

More specifically, the acquirer 64-1 receives two commitments $A_1$, $B_1$ and two response values $Z_{1,1}$, $Z_{2,1}$. The acquirer 64-2 receives two commitments $A_2$, $B_2$ and two response values $Z_{1,2}$, $Z_{2,2}$. The acquirer 64-$k$ receives two commitments $A_k$, $B_k$ and two response values $Z_{1,k}$, $Z_{2,k}$.

The combined acquirer 93 receives two commitments $A_{ttl}$, $B_{ttl}$ and two response values $Z_{1,ttl}$, $Z_{2,ttl}$.

The verification device challenge generator 72 inputs the k sets of commitments $(A_1, B_1)$ to $(A_k, B_k)$ received by the k acquirers 64-1 to 64-$k$ and one set of combined commitments $(A_{ttl}, B_{ttl})$ received by the combined acquirer 93. The verification device challenge generator 72 then inputs (2k+2) commitments to a hash function and outputs k challenge values $e_1, e_2, \ldots, e_k$ and one combined challenge value $e_{ttl}$. Note that the verification device challenge generator 72 generates the challenge values $e_1, e_2, \ldots, e_k$ and the combined challenge value $e_{ttl}$ by the same hash function and the same procedure as that used by the authenticator challenge generator 71. Thus, there are variations of the challenge generator 72 where they are the same as the variations of the authenticator challenge generator 71.

The k verifiers 65-1 to 65-$k$ are respectively associated with the k sets of subject ciphertexts $(C_{1,1}, C_{2,1})$ to $(C_{1,k}, C_{2,k})$ and each perform the same processing as the verifier 65 of the first embodiment on the associated subject ciphertexts.

More specifically, the verifier 65-1 determines whether or not the subject ciphertexts $(C_{1,1}, C_{2,1})$ are valid on the basis of two commitments $A_1$, $B_1$, two response values $Z_{1,1}$, $Z_{2,1}$, the challenge value $e_1$, and the subject ciphertexts $(C_{1,1}, C_{2,1})$. The verifier 65-1 supplies acceptance (Accept) to the decryption device 40 if the subject ciphertexts $(C_{1,1}, C_{2,1})$ are valid, and supplies rejection (Reject) to the decryption device 40 if the subject ciphertexts $(C_{1,1}, C_{2,1})$ are not valid.

The verifier 65-2 determines whether or not the subject ciphertexts $(C_{1,2}, C_{2,2})$ are valid on the basis of two commitments $A_2$, $B_2$, two response values $Z_{1,2}$, $Z_{2,2}$, the challenge value $e_2$, and the subject ciphertexts $(C_{1,2}, C_{2,2})$. The verifier 65-2 supplies acceptance (Accept) to the decryption device 40 if the subject ciphertexts $(C_{1,2}, C_{2,2})$ are valid, and supplies rejection (Reject) to the decryption device 40 if the subject ciphertexts $(C_{1,2}, C_{2,2})$ are not valid.

The verifier 65-$k$ determines whether or not the subject ciphertexts $(C_{1,k}, C_{2,k})$ are valid on the basis of two commitments $A_k$, $B_k$, two response values $Z_{1,k}$, $Z_{2,k}$, the challenge value $e_k$, and the subject ciphertexts $(C_{1,k}, C_{2,k})$. The verifier 65-$k$ supplies acceptance (Accept) to the decryption device 40 if the subject ciphertexts $(C_{1,k}, C_{2,k})$ are valid, and supplies rejection (Reject) to the decryption device 40 if the subject ciphertexts $(C_{1,k}, C_{2,k})$ are not valid.

The combined verifier 94 acquires all of the k sets of subject ciphertexts $(C_{1,1}, C_{2,1})$ to $(C_{1,k}, C_{2,k})$. The combined verifier 94 then generates the combined subject ciphertexts $(C_{1,ttl}, C_{2,ttl})$ generated by combining k sets of subject ciphertexts $(C_{1,1}, C_{2,1})$ to $(C_{1,k}, C_{2,k})$ by homomorphic operation. For example, in the modified ElGamal encryption, the combined verifier 94 multiplies the k sets of subject ciphertexts $(C_{1,1}, C_{2,1})$ to $(C_{1,k}, C_{2,k})$ to generate the combined subject ciphertexts $(C_{1,ttl}, C_{2,ttl})$.

The combined verifier 94 then performs the same processing as the verifier 65 on the basis of two combined commitments $A_{ttl}$, $B_{ttl}$, two combined response values $Z_{1,ttl}$, $Z_{2,ttl}$, the combined challenge value $e_{ttl}$, and the combined subject ciphertexts $(C_{1,ttl}, C_{2,ttl})$ to determine whether the k sets of subject ciphertexts $(C_{1,1}, C_{2,1})$ to $(C_{1,k}, C_{2,k})$ are valid. The combined verifier 94 supplies acceptance (Accept) to the decryption device 40 if the k sets of subject ciphertexts $(C_{1,1}, C_{2,1})$ to $(C_{1,k}, C_{2,k})$ are valid, and supplies rejection (Reject) to the decryption device 40 if the subject ciphertexts $(C_{1,1}, C_{2,1})$ to $(C_{1,k}, C_{2,k})$ are not valid.

Figure 8:
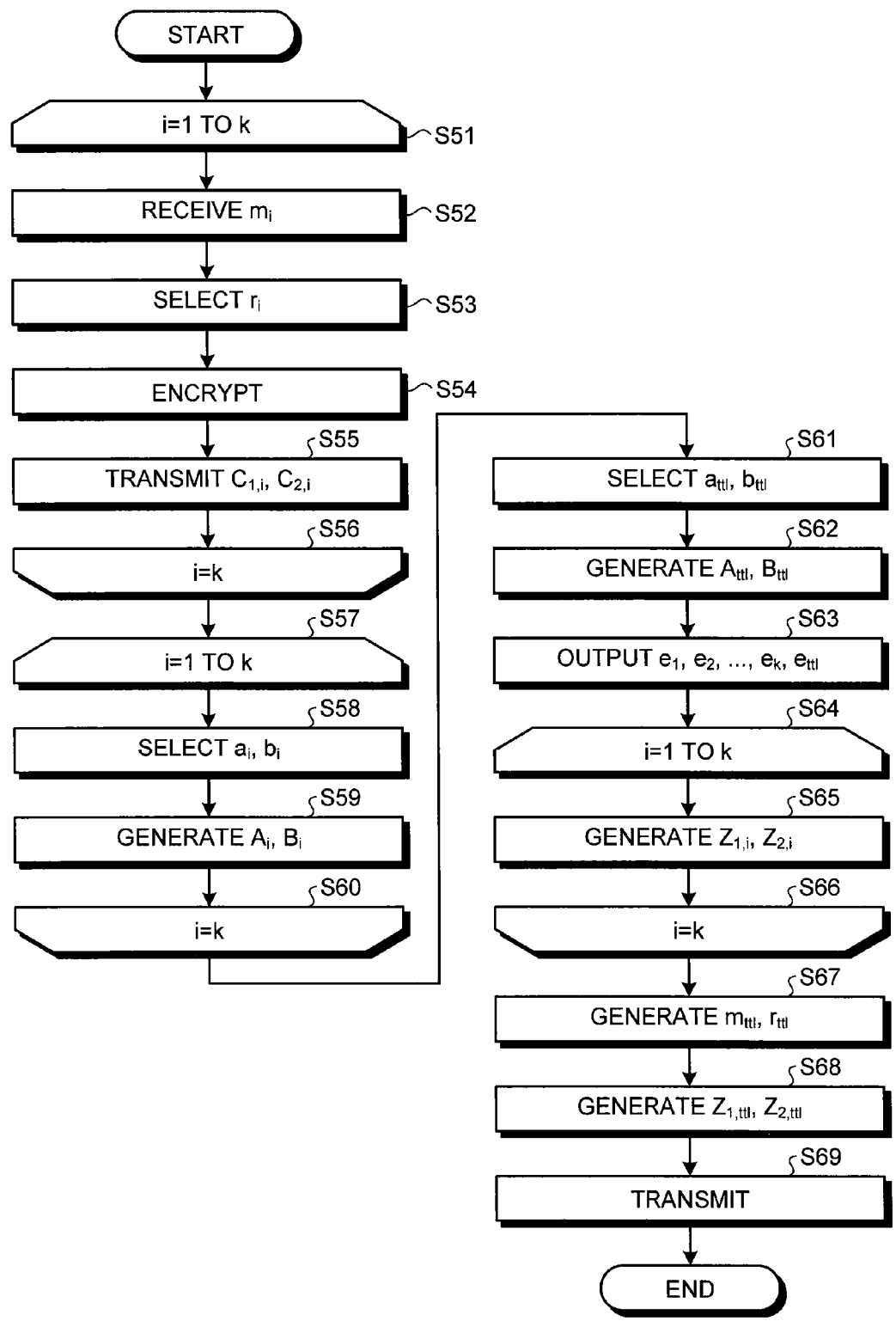
FIG. 8 is a flowchart of processing performed by an encryption device and the authentication device according to the third embodiment.

FIG. 8 is a chart illustrating a process flow of the encryption device 20 and the authentication device 30 according to the third embodiment. With reference to FIG. 8, the process flow of the encryption device 20 and the authentication device 30 according to the third embodiment using the modified ElGamal encryption will be described.

First, in steps S51 to S56, the encryption device 20 performs a loop process while incrementing i by 1 from i=1 to i=k. In step S52 in the loop process, the encryption device 20 receives a plaintext $m_i$. Subsequently, in step S53, the encryption device 20 randomly selects a random number $r_i$ from a cyclic group $Z_q$.

Subsequently, in step S54, the encryption device 20 encrypts the plaintext $m_i$ by using the random number $r_i$ by the modified ElGamal encryption. Specifically, the encryption device 20 generates the subject ciphertexts $C_{1,i}$, $C_{2,i}$ by computing the following Equation (221) and Equation (222).

$$C_{1,i} = g \char`^ r_i \text{ over } G_q \tag{221}$$

$$C_{2,i} = g \char`^ m_i \cdot PK \char`^ r_i \text{ over } G_q \tag{222}$$

At the rest of this embodiment, algebraic operations are defined over $G_q$ without no special notes.

Subsequently, in step S55, the encryption device 20 transmits the subject ciphertexts $C_{1,i}$, $C_{2,i}$ to the decryption device 40. As a result of finishing the loop process of steps S51 to S56 up to i=k, the encryption device 20 can transmit k sets of subject ciphertexts $(C_{1,1}, C_{2,1})$ to $(C_{1,k}, C_{2,k})$ to the decryption device 40. After finishing the loop process of steps S51 to S56 up to i=k, the encryption device 20 proceeds the processing to step S57.

Subsequently, in steps S57 to S60, the authentication device 30 performs a loop process while incrementing i by 1 from i=1 to i=k. In step S58 in the loop process, the authentication device 30 randomly selects two verification values $a_i$, $b_i$ from the cyclic group $Z_q$.

Subsequently, in step S59, the authentication device 30 encrypts the verification value $b_i$ with the verification value $a_i$ as the random number by the modified ElGamal encryption to generate two commitments $A_i$, $B_i$. Specifically, the authentication device 30 generates two commitments $A_i$, $B_i$ by computing the following Equation (223) and Equation (224) on the basis of the two verification values $a_i$, $b_i$, the generator g, and the public key PK.

$$A_i = g \char`^ a_i \tag{223}$$

$$B_i = g \char`^ b_i \cdot PK \char`^ a_i \tag{224}$$

As a result of finishing the loop process in steps S57 to S60 up to i=k, the authentication device 30 can generate k sets of commitments $(A_1, B_1)$ to $(A_k, B_k)$. After finishing the loop process of steps S57 to S60 up to i=k, the authentication device 30 proceeds the processing to step S61.

Subsequently, in step S61, the authentication device 30 randomly selects two combined verification values $a_{ttl}$, $b_{ttl}$ from the cyclic group $Z_q$.

Subsequently, in step S62, the authentication device 30 encrypts the combined verification value $b_{ttl}$ with the combined verification value $a_{ttl}$ as the random number by the modified ElGamal encryption to generate two combined commitments $A_{ttl}$, $B_{ttl}$. Specifically, the authentication device 30 generates two combined commitments $A_{ttl}$, $B_{ttl}$ by computing the following Equation (225) and Equation (226) on the basis of the two combined verification values $a_{ttl}$, $b_{ttl}$, the generator g, and the public key PK.

$$A_{ttl} = g \char`^ a_{ttl} \tag{225}$$

$$B_{ttl} = g \char`^ b_{ttl} \cdot PK \char`^ a_{ttl} \tag{226}$$

Subsequently, in step S63, the authentication device 30 inputs k sets of commitments $(A_1, B_1)$ to $(A_k, B_k)$ and one set of combined commitments $(A_{ttl}, B_{ttl})$ to a hash function and outputs k challenge values $e_1, e_2, \ldots, e_k$ and one combined challenge value $e_{ttl}$. The authentication device 30 outputs (k+1) values from (2K+2) values through the hash function of the following Expression (227) as an example where $\{0,1\}^*$ indicates arbitrary bit string. Note that $G_q$ represents a cyclic group.

$$H:\{0,1\}^* \rightarrow Z_q^{K+1} \tag{227}$$

Subsequently, in steps S64 to S66, the authentication device 30 performs a loop process while incrementing i by 1 from i=1 to i=k. In step S65 in the loop process, the authentication device 30 generates two response values $Z_{1,i}$, $Z_{2,i}$ by computing the following Equation (228) and Equation (229) on the basis of the two verification values $a_i$, $b_i$, the random number $r_i$, the plaintext $m_i$, the challenge value $e_i$, and the order q of the cyclic group $Z_q$.

$$Z_{1,i} = (a_i + e_i \cdot r_i) \mod q \tag{228}$$

$$Z_{2,i} = (b_i + e_i \cdot m_i) \mod q \tag{229}$$

As a result of finishing the loop process in steps S64 to S66 up to i=k, the authentication device 30 can generate k sets of response values $(Z_{1,1}, Z_{2,1})$ to $(Z_{1,k}, Z_{2,k})$. After finishing the loop process of steps S64 to S66 up to i=k, the authentication device 30 proceeds the processing to step S67.

Subsequently, in step S67, the authentication device 30 adds all of k plaintexts $m_1, m_2, \ldots, m_k$ over the cyclic group $Z_q$ as expressed by the following Equation (230) to generate a combined plaintext $m_{ttl}$. In this manner, the authentication device 30 can combine k plaintexts $m_1, m_2, \ldots, m_k$ by operation corresponding to the homomorphic operation.

$$m_{ttl} = (m_1 + m_2 + \ldots + m_k) \mod q \tag{230}$$

At the same time, in step S67, the authentication device 30 adds all of k random numbers $r_1, r_2, \ldots, r_k$ over the cyclic group $Z_q$ as expressed by the following Equation (231) to generate a combined random number $r_{ttl}$. In this manner, the authentication device 30 can combine k random numbers $r_1, r_2, \ldots, r_k$ by operation corresponding to the homomorphic operation.

$$r_{ttl} = (r_1 + r_2 + \ldots + r_k) \mod q \tag{231}$$

Subsequently, in step S68, the authentication device 30 generates two combined response values $Z_{1,ttl}$, $Z_{2,ttl}$ by computing the following Equation (232) and Equation (233) on the basis of the combined challenge value $e_{ttl}$, the combined plaintext $m_{ttl}$, the combined random number $r_{ttl}$, two combined verification values $a_{ttl}$, $b_{ttl}$, and the order q of the cyclic group $Z_q$.

$$Z_{1,ttl} = (a_{ttl} + e_{ttl} \cdot r_{ttl}) \mod q \tag{232}$$

$$Z_{2,ttl} = (b_{ttl} + e_{ttl} \cdot m_{ttl}) \mod q \tag{233}$$

Subsequently, in step S69, the authentication device 30 transmits k sets of commitments $(A_1, B_1)$ to $(A_k, B_k)$, one set of combined commitments $(A_{ttl}, B_{ttl})$, k sets of response values $(Z_{1,1}, Z_{2,1})$ to $(Z_{l,k}, Z_{2,k})$, and one set of combined commitments $(Z_{1,ttl}, Z_{2,ttl})$ to the verification device 50.

Figure 9:
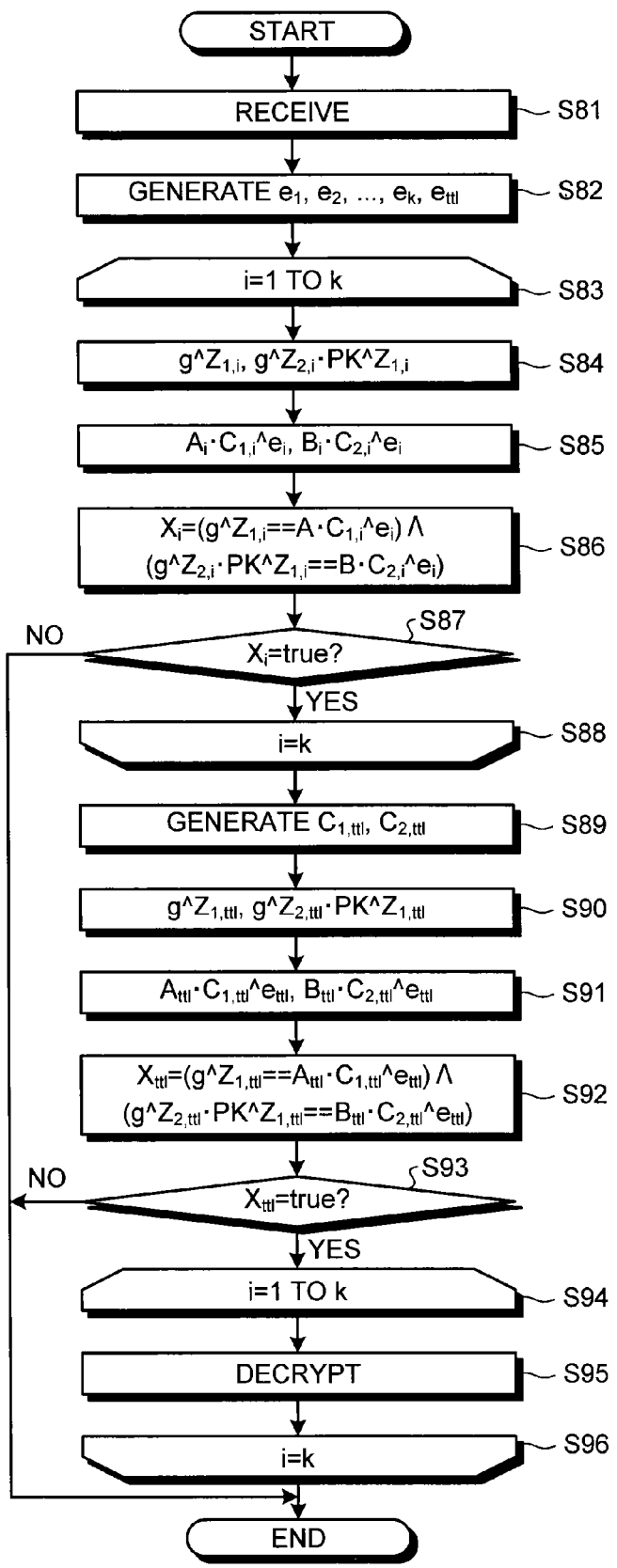
FIG. 9 is a flowchart of processing performed by a decryption device and a verification device according to the third embodiment.

FIG. 9 is a chart illustrating a process flow of the decryption device 40 and the verification device 50 according to the third embodiment.

First, in step S81, the verification device 50 receives from the authentication device 30 k sets of commitments $(A_1, B_1)$ to $(A_k, B_k)$, one set of combined commitments $(A_{ttl}, B_{ttl})$, k sets of response values $(Z_{1,1}, Z_{2,1})$ to $(Z_{1,k}, Z_{2,k})$, and one set of combined commitments $(Z_{1,ttl}, Z_{2,ttl})$.

Subsequently, in step S82, the verification device 50 inputs the received k sets of commitments $(A_1, B_1)$ to $(A_k, B_k)$ and one set of combined commitments $(A_{ttl}, B_{ttl})$ to a hash function and outputs k challenge values $e_1, e_2, \ldots, e_k$ and one combined challenge value $e_{ttl}$. Note that the verification device 50 generates the k challenge values $e_1$ to $e_k$ and one combined challenge value $e_{ttl}$ by the same hash function as that used by the authentication device 30.

Subsequently, in steps S83 to S88, the verification device 50 performs a loop process while incrementing i by 1 from i=1 to i=k.

In step S84 in the loop process, the verification device 50 encrypts the response value $Z_{2,i}$ with the response value $Z_{1,i}$ as the random number by the modified ElGamal encryption to generate a first left-hand side ciphertext and a second left-hand side ciphertext. Specifically, the verification device 50 generates the first left-hand side ciphertext and the second left-hand side ciphertext by computing the following Equation (234) and Equation (235) on the basis of the two response values $Z_{1,i}$, $Z_{2,i}$, the generator g, and the public key PK.

$$\text{First left-hand side ciphertext} = g^{\hat{}}Z_{1,i} \quad (234)$$

$$\text{Second left-hand side ciphertext} = g^{\hat{}}Z_{2,i} \cdot PK^{\hat{}}Z_{1,i} \quad (235)$$

Subsequently, in step S85, the verification device 50 computes the following Expression (236) to generate a first right-hand side ciphertext using the challenge value $e_i$, the subject ciphertext $C_{1,i}$, and the commitment $A_i$ by the homomorphic operation. The verification device 50 also computes following Expression (237) to generate a second right-hand side ciphertext using the challenge value $e_i$, the subject ciphertext $C_{2,i}$, and the commitment $B_i$ by the homomorphic operation.

$$\text{First right-hand side ciphertext} = A_i \cdot C_{1,i}{}^{\hat{}}e_i \quad (236)$$

$$\text{Second right-hand side ciphertext} = B_i \cdot C_{2,i}{}^{\hat{}}e_i \quad (237)$$

Subsequently, in step S86, the verification device 50 computes the following Equation (238).

$$X_i = (\text{first left-hand side ciphertext} == \text{first right-hand side ciphertext}) \wedge (\text{second left-hand side ciphertext} == \text{second right-hand side ciphertext}) = (g^{\hat{}}Z_{1,i} == A_i \cdot C_{1,i}{}^{\hat{}}e_i) \wedge (g^{\hat{}}Z_{2,i} \cdot PK^{\hat{}}Z_{1,i} == B_i \cdot C_{2,i}{}^{\hat{}}e_i) \quad (238)$$

Subsequently, in step S87, the verification device 50 determines whether or not $X_i$ is true. If $X_i$ is true (Yes in step S87), the verification device 50 proceeds the processing to step S88. If $X_i$ is false (No in step S87), the verification device 50 exits the loop process and terminates this flow.

As a result of finishing the loop process of steps S83 to S88 up to i=k, the verification device 50 can verify that each of the k sets of subject ciphertexts $(C_{1,1}, C_{2,1})$ to $(C_{1,k}, C_{2,k})$ is valid. After finishing the loop process of steps S83 to S88 up to i=k, the verification device 50 proceeds the processing to step S89.

Subsequently, in step S89, the verification device 50 multiplies the k sets of subject ciphertexts $(C_{1,1}, C_{2,1})$ to $(C_{1,k}, C_{2,k})$ over a cyclic group G as expressed by the following Equation (239) and Equation (240) to generate combined subject ciphertexts $(C_{1,ttl}, C_{2,ttl})$.

$$C_{1,ttl} = (C_{1,1} \cdot C_{1,2} \cdot \ldots \cdot C_{1,k}) \text{ over } G_q \quad (239)$$

$$C_{2,ttl} = (C_{2,1} \cdot C_{2,2} \cdot \ldots \cdot C_{2,k}) \text{ over } G_q \quad (240)$$

In Equation (239) and Equation (240), $G_q$ represents a cyclic group having the subject ciphertexts as elements. Furthermore, (x·y over $G_q$) represents multiplication over the cyclic group $G_q$.

The verification device 50 can combine k sets of subject ciphertexts $(C_{1,1}, C_{2,1})$ to $(C_{1,k}, C_{2,k})$ by homomorphic operation by computing Equation (239) and Equation (240).

Subsequently, in step S90, the verification device 50 encrypts the combined response value $Z_{2,ttl}$ with the combined response value $Z_{1,ttl}$ as the random number by the modified ElGamal encryption to generate a first left-hand side ciphertext and a second left-hand side ciphertext. Specifically, the verification device 50 generates the first left-hand side ciphertext and the second left-hand side ciphertext by computing the following Equation (241) and Equation (242) on the basis of the two combined response values $Z_{1,ttl}$, $Z_{2,ttl}$, the generator g, and the public key PK.

$$\text{First left-hand side ciphertext} = g^{\hat{}}Z_{1,ttl} \quad (241)$$

$$\text{Second left-hand side ciphertext} = g^{\hat{}}Z_{2,ttl} \cdot PK^{\hat{}}Z_{1,ttl} \quad (242)$$

Subsequently, in step S91, the verification device 50 computes the following Equation (243) to generate a first right-hand side ciphertext using the combined challenge value $e_{ttl}$, the combined subject ciphertext $C_{1,ttl}$, and the combined commitment $A_{ttl}$ by the homomorphic operation. The verification device 50 also computes the following Equation (244) to generate a second right-hand side ciphertext using the combined challenge value $e_{ttl}$, the combined subject ciphertext $C_{2,ttl}$, and the combined commitment $B_{ttl}$ by the homomorphic operation.

$$\text{First right-hand side ciphertext} = A_{ttl} \cdot C_{1,ttl}{}^{\hat{}}e_{ttl} \quad (243)$$

$$\text{Second right-hand side ciphertext} = B_{ttl} \cdot C_{2,ttl}{}^{\hat{}}e_{ttl} \quad (244)$$

Subsequently, in step S92, the verification device 50 computes the following Equation (245).

$$X_{ttl} = (\text{first left-hand side ciphertext} == \text{first right-hand side ciphertext}) \wedge (\text{second left-hand side ciphertext} == \text{second right-hand side ciphertext}) = (g^{\hat{}}Z_{1,ttl} == A_{ttl} \cdot C_{1,ttl}{}^{\hat{}}e_{ttl}) \wedge (g^{\hat{}}Z_{2,ttl} \cdot PK^{\hat{}}Z_{1,ttl} == B_{ttl} \cdot C_{2,ttl}{}^{\hat{}}e_{ttl}) \quad (245)$$

Subsequently, in step S93, the verification device 50 determines whether or not $X_{ttl}$ is true. If $X_{ttl}$ is true (Yes in step S93), the verification device 50 proceeds the processing to step S94. If $X_i$ is false (No in step S93), the verification device 50 exits the loop process and terminates this flow.

Subsequently, in steps S94 to S96, the decryption device 40 performs a loop process while incrementing i by 1 from i=1 to i=k. In step S95 in the loop process, the decryption device 40 decrypts the subject ciphertexts $C_{1,i}$, $C_{2,i}$ received from the encryption device 20 and outputs the plaintext $m_i$.

As a result of finishing the loop process of steps S94 to S96 up to i=k, the decryption device 40 can output k plaintexts $m_1$ to $m_k$. After finishing the loop process of steps S94 to S96 up to i=k, the decryption device 40 terminates this flow.

As described above, according to the cryptographic system 10 according to the third embodiment, it is possible to verify whether or not a set of subject ciphertexts is valid. According to the cryptographic system 10, each of multiple subject ciphertexts is individually verified and the multiple subject ciphertexts are also combined and verified, which allows more secure verification.

Furthermore, in the third embodiment, the authentication device 30 may have a configuration without multiple commitment generators 61-1 to 61-$k$ and multiple response generators 62-1 to 62-$k$. Thus, the authentication device 30 may have a configuration including the combined commitment generator 91, the combined response generator 92, and the authenticator challenge generator 71.

In this case, the verification device 50 may have a configuration without multiple acquirers 64-1 to 64-$k$ and multiple verifiers 65-1 to 65-$k$. Thus, the verification device 50 may have a configuration including the combined acquirer 93, the combined verifying unit 94, and the verification device challenge generator 72.

As a result, the authentication device 30 and the verification device 50 need not verify each of multiple subject ciphertexts individually, which can make the configuration very simple.

While the k challenge values $e_1, e_2, \ldots, e_k$ and the one combined challenge value $e_{ttl}$ are different from one another in the third embodiment, all of these may be of the same value. Specifically, the authenticator challenge generator 71 in receipt of k sets of commitments $(A_1, B_1)$ to $(A_k, B_k)$ and one set of combined commitments $(A_{ttl}, B_{ttl})$ output from the combined commitment generator 91 outputs one challenge value e and outputs the output challenge value e to the response generators 62-1 to 62-k and the combined response generator 92. The verification device challenge generator 72 in receipt of the k sets of commitments $(A_1, B_1)$ to $(A_k, B_k)$ received by the k acquirers 64-1 to 64-k and one set of combined commitments $(A_{ttl}, B_{ttl})$ received by the combined acquirer 93, inputs (2k+2) commitments to a hash function and outputs one challenge value e to the verifiers 65-1 to 65-k and the combined verifier 94. With such a configuration, the bit length of the challenges to be generated by the authenticator challenge generator 71 and the verification device challenge generator 72 can be reduced.

Figure 10:
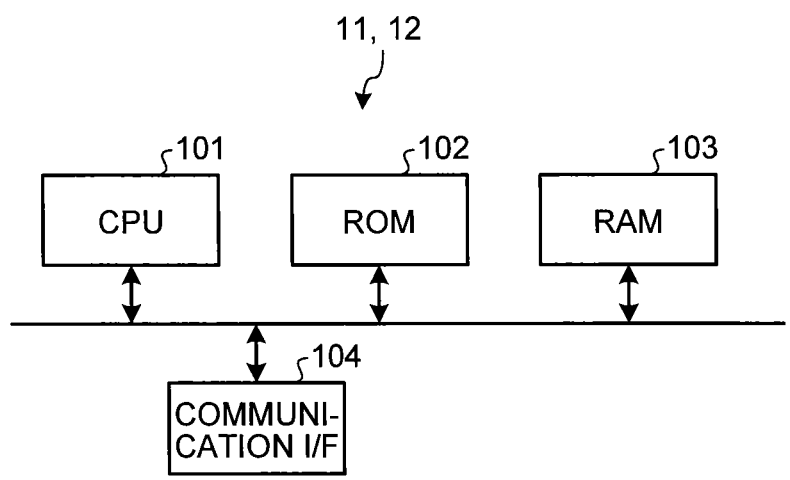
FIG. 10 is a configuration diagram of an output device and an input device according to the first to third embodiment.

FIG. 10 is a diagram illustrating an example of the hardware configuration of the output device 11 and the input device 12 according to the first to third embodiments. The output device 11 and the input device 12 according to the first to third embodiments each include a controller such as a central processing unit (CPU) 101, a storage unit such as a read only memory (ROM) 102 and a random access memory (RAM) 103, a communication interface (I/F) 104 for connecting to a network for communication, and a bus that connects these components.

Programs to be executed by the output device 11 and the input device 12 according to the embodiments are embedded on the ROM 102 or the like in advance and provided therefrom.

The programs to be executed by the output device 11 and the input device 12 may alternatively be recorded on a computer readable storage medium such as a compact disk read only memory (CD-ROM), a flexible disk (FD), a compact disk recordable (CD-R), and a digital versatile disk (DVD) in a form of a file that can be installed or executed, and provided as a computer program product.

Alternatively, the programs to be executed by the output device 11 and the input device 12 according to the embodiments may be stored on a computer system connected to a network such as the Internet, and provided by being downloaded via the network. Still alternatively, the programs to be executed by the output device 11 and the input device 12 according to the embodiments may be provided or distributed through a network such as the Internet.

The programs to be executed by the output device 11 according to the embodiments can cause a computer to function as each of the components (commitment generators 61, 61-1 to 61-k, response generators 62, 62-1 to 62-k, authenticator challenge generator 71, encryptors 81-1 to 81-k, combined commitment generator 91, and combined response generator 92) of the output device 11 described above. Note that some or all of the components may be implemented by hardware.

Furthermore, the programs to be executed by the input device 12 according to the embodiments can cause a computer to function as each of the components (challenge generator 63, acquirers 64, 64-1 to 64-k, verifiers 65, 65-1 to 65-k, verification device challenge generator 72, decryptors 82-1 to 82-k, combined acquirer 93, and combined verifier 94) of the input device 12 described above. Note that some or all of the components may be implemented by hardware. In the computer, the CPU 101 can read out programs from a computer-readable storage medium onto a main storage unit and execute the programs.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An authentication device comprising:
   a memory; and
   a processor configured to authenticate the validity of a subject ciphertext generated by encrypting a plaintext using homomorphic encryption, and to function as:
   a commitment generator configured to generate a commitment from information at least including a randomly selected verification value, and transmit the commitment to a verification device for verifying the validity of the subject ciphertext; and
   a response generator configured to generate a response value generated by computing from information at least including an acquired challenge value, the plaintext, and the verification value, and transmit the response value to the verification device, wherein
   the response generator is configured to generate the response value by a third operation where a result of a first operation using the response value is equal to a result of processing the challenge value, the subject ciphertext, and the commitment by a second operation.

2. The authentication device according to claim 1, wherein
   the commitment generator is configured to generate a commitment by encrypting the verification value by the homomorphic encryption, and transmit the commitment to the verification device, and
   the response generator is configured to generate the response value by an operation where a ciphertext generated by encrypting a result of the operation by the homomorphic encryption is equal to a ciphertext generated by computing from the challenge value, the subject ciphertext, and the commitment by a predetermined homomorphic operation.

3. The authentication device according to claim 1, wherein the processor is further configured to function as:
   an authenticator challenge generator configured to input at least information including the commitment to a hash function to generate the challenge value.

4. The authentication device according to claim 1, wherein the homomorphic encryption is modified ElGamal encryption.

5. The authentication device according to claim 4, wherein
   the commitment generator is configured to generate two commitments A and B, respectively, expressed by $$A = g^a$$

$$B = g^b \cdot PK^a$$

where a and b are two verification values, PK is a public key, g is a generator of a cyclic group, and the public key and the generator of a cyclic group are used in the modified ElGamal encryption, and the response generator is configured to generates two response values $Z_1$ and $Z_2$, respectively, expressed by $$Z_1 = (a + e \cdot r) \bmod q$$

$$Z_2 = (b + e \cdot m) \bmod q$$

where r is a random number, m is a plaintext, the random number and the plaintext are used to generate the subject ciphertext, e is a challenge value, and q is an order used in the modified ElGamal encryption.

6. The authentication device according to claim 1, wherein
the authentication device is configured to authenticate the validity of multiple subject ciphertexts generated by encrypting multiple plaintexts by the same homomorphic operation,
the authentication device wherein the processor is further configured to function as:
a combined commitment generator configured to generate a combined commitment generated by encrypting a randomly selected combined verification value by the homomorphic encryption, and transmit the combined commitment to the verification device; and
a combined response generator configured to generate a combined response value generated by computing from an acquired combined challenge value, the multiple plaintexts, and the combined verification value, and transmit the combined response value to the verification device, and
the combined response generator is configured to generate the combined response value by an operation where ciphertexts generated by encrypting a result of the operation by the homomorphic encryption are equal to ciphertexts generated by computing from the combined challenge value, the subject ciphertexts, and the combined commitment by a predetermined homomorphic operation.

7. The authentication device according to claim 6, wherein
the homomorphic encryption is modified ElGamal encryption,
the commitment generator is configured to generate two modified commitments $A_{ttl}$ and $B_{ttl}$, respectively, expressed by $$A_{ttl} = g \hat{} a_{ttl}$$

$$B_{ttl} = g \hat{} b_{ttl} \cdot PK \hat{} a_{ttl}$$

where $a_{ttl}$ and $b_{ttl}$ are modified verification values, PK is a public key, g is a generator of a cyclic group, and the public key and the generator of a cyclic group are used in the modified ElGamal encryption, and
the modified response generator is configured to generate two modified response values $Z_{1,ttl}$ and $Z_{2,ttl}$, respectively, expressed by $$Z_{1,ttl} = a_{ttl} + e_{ttl} \cdot ((r_1 + r_2 + \ldots + r_k) \bmod q)) \bmod q$$

$$Z_{2,ttl} = b_{ttl} + e_{ttl} \cdot ((m_1 + m_2 + \ldots + m_k) \bmod q)) \bmod q$$

where $r_1, r_2, \ldots, r_k$ are k random numbers, $m_1, m_2, \ldots, m_k$ are k plaintexts, k is an integer of 2 or greater, the k random numbers and the k plaintexts are used to generate the subject ciphertexts, $e_{ttl}$ is a combined challenge value, and q is an order used in the modified ElGamal encryption.

8. The authentication device according to claim 6, wherein the processor is further configured to function as:
multiple commitment generators, respectively, associated with the multiple subject ciphertexts; and
multiple response generators, respectively, associated with the multiple subject ciphertexts.

9. An output device comprising:
an encryption device configured to generate a subject ciphertext generated by encrypting a plaintext using homomorphic encryption; and
the authentication device according to claim 1, configured to authenticate the validity of the subject ciphertext generated by the encryption device.

10. A verification device comprising:
a memory; and
a processor configured to verify the validity of a subject ciphertext generated by encrypting a plaintext using homomorphic encryption, and to function as:
an acquirer configured to acquire, from an authentication device for authenticating the validity of the subject ciphertext, a commitment generated from information at least including a randomly selected verification value and a response value generated by computing from information at least including an acquired challenge value, the plaintext, and the verification value; and
a verifier configured to determine that the subject ciphertext is valid when a result of operating the response value by a first operation and a result of operating the challenge value, the subject ciphertext, and the commitment by a second operation are equal to each other, wherein
the result of the first operation and the result of the second operation are equal when the response value is generated through a predetermined procedure.

11. The verification device according to claim 10, wherein
the acquirer is configured to acquire the commitment generated by encrypting the verification value by the homomorphic encryption and the response value from the authentication device,
the verifier is configured to determine that the subject ciphertext is valid when a ciphertext generated by encrypting the response value by the homomorphic encryption and a ciphertext generated by computing from the challenge value, the subject ciphertext, and the commitment by a predetermined homomorphic operation are equal to each other, and
the verifier is configured to compute from the challenge value, the subject ciphertext, and the commitment by a homomorphic operation where a result of the operation is equal to a ciphertext generated by encrypting the response value by the homomorphic encryption when the response value is generated through a predetermined procedure.

12. The verification device according to claim 10, wherein the processor is further configured to function as:
a verification device challenge generator configured to input the commitment to a hash function to generate the challenge value.

13. The verification device according to claim 10, wherein the homomorphic encryption is modified ElGamal encryption.

14. The verification device according to claim 13, wherein
the acquirer is configured to acquire two commitments A and B, respectively, expressed by $$A = g^a$$

$$B = g^b \cdot PK^a$$

where a and b are two verification values, PK is a public key, g is a generator of a cyclic group, the public key and the generator of a cyclic group are used in the modified ElGamal encryption, and the acquirer is configured to further acquire two response values $Z_1$ and $Z_2$, respectively, expressed by $$Z_1 = (a + e \cdot r) \bmod q$$

$$Z_2 = (b + e \cdot m) \bmod q$$

where r is a random number, m is a plaintext m, the random number and the plaintext are used to generate the subject ciphertext, e is a challenge value, and q is an order used in the modified ElGamal encryption.

15. The verification device according to claim 14, wherein the verifier is configured to determine that the subject ciphertexts are valid when $(g^{\hat{}}Z_1 == A \cdot C_1^e) \wedge (g^{\hat{}}Z_2 \cdot PK^{\hat{}}Z_1 == B \cdot C_2^e)$ is true, where $C_1$ and $C_2$ are the subject ciphertexts, and, respectively, expressed by $$C_1 = g^r$$

$$C_2 = g^m \cdot PK^r.$$

16. The verification device according to claim 10, wherein
the verification device is configured to verify the validity of multiple subject ciphertexts generated by encrypting multiple plaintexts by the same homomorphic encryption, the verification device wherein the processor is further configured to function as:
  a combined acquirer configured to acquire, from the authentication device, a combined commitment generated by encrypting a randomly selected combined verification value by the homomorphic encryption and a combined response value generated by computing from an acquired combined challenge value and the plaintexts, and the combined verification value, and
  a combined verifier configured to determine that the subject ciphertexts are valid when ciphertexts generated by encrypting the combined response value by the homomorphic encryption and ciphertexts generated by computing from the combined challenge value and the subject ciphertexts, and the combined commitment by a predetermined homomorphic operation are equal to each other, and the combined verifier is configured to compute from the combined challenge value, the subject ciphertexts, and the combined commitment by a homomorphic operation where a result of the operation is equal to a ciphertext generated by encrypting the combined response value by the homomorphic encryption.

17. The verification device according to claim 16, wherein
the homomorphic encryption is modified ElGamal encryption, the combined acquirer is configured to acquire two combined commitments $A_{ttl}$ and $B_{ttl}$, respectively, expressed by $$A_{ttl} = g^{\hat{}}a_{ttl}$$

$$B_{ttl} = g^{\hat{}}b_{ttl} \cdot PK^{\hat{}}a_{ttl}$$

where $a_{ttl}$ and $b_{ttl}$ are two combined verification values, PK is a public key, g is a generator of a cyclic group, and the public key and the generator of a cyclic group are used in the modified ElGamal encryption, and the combined acquirer is configured to further acquire two combined response values $Z_{1,ttl}$ and $Z_{2,ttl}$, respectively, expressed by $$Z_{1,ttl} = a_{ttl} + e_{ttl} \cdot ((r_1 + r_2 + \ldots + r_k) \bmod q)) \bmod q$$

$$Z_{2,ttl} = b_{ttl} + e_{ttl} \cdot ((m_1 + m_2 + \ldots + m_k) \bmod q)) \bmod q$$

where $r_1, r_2, \ldots, r_k$ are k random numbers, $m_1, m_2, \ldots, m_k$ are k plaintexts, k is an integer of 2 or greater, the k random numbers are the k plaintexts are used to generate the subject ciphertexts, $e_{ttl}$ is a combined challenge value, and q is an order used in the modified ElGamal encryption.

18. The verification device according to claim 17, wherein
the verifier is configured to determine that the subject ciphertexts are valid when $(g^{\hat{}}Z_{1,ttl} == A_{ttl} \cdot (C_{1,1} \cdot C_{1,2} \cdot \ldots \cdot C_{1,k}) \wedge (g^{\hat{}}Z_{2,ttl} \cdot PK^{\hat{}}Z_{1,ttl} == B_{ttl} \cdot (C_{2,1} \cdot C_{2,2} \cdot \ldots \cdot C_{2,k})^{\hat{}}e_{ttl})$ is true, where $C_{1,i}$ and $C_{2,i}$ are the subject ciphertexts, and, respectively, expressed by $$C_{1,i} = g^{\hat{}}r_i$$

$$C_{2,i} = g^{\hat{}}m_i \cdot PK^{\hat{}}r_i,$$

and i is an integer of 1 or greater and k or smaller.

19. The verification device according to claim 16, wherein the processor is further configured to function as:
  multiple acquirers respectively associated with the multiple subject ciphertexts; and
  multiple verifiers respectively associated with the multiple subject ciphertexts.

20. An input device comprising:
  a decryption device configured to decrypt a subject ciphertext generated by encrypting a plaintext using homomorphic encryption; and
  a verification device according to claim 10, configured to verify validity of the subject ciphertext to be decrypted by the decryption device.

* * * * *